United States Patent
Usui et al.

[11] Patent Number: 6,144,020
[45] Date of Patent: Nov. 7, 2000

[54] APPARATUS FOR SIMULTANEOUSLY GENERATING A FLUID FLOW AND HEATING THE FLOWING FLUID

[75] Inventors: Masayoshi Usui; Hiroshi Inoue, both of Numazu, Japan

[73] Assignee: Usui Kokusai Sangyo Kaisha Limited, Japan

[21] Appl. No.: 09/310,403

[22] Filed: May 12, 1999

[30] Foreign Application Priority Data

May 19, 1998 [JP] Japan ................................. 10-153728

[51] Int. Cl.⁷ ......................................... H05B 6/10
[52] U.S. Cl. ...................... 219/631; 219/628; 219/630; 219/672
[58] Field of Search .................... 219/628, 629, 219/630, 631, 672

[56] References Cited

U.S. PATENT DOCUMENTS

| | | | |
|---|---|---|---|
| 3,821,508 | 6/1974 | Hagerty | 219/631 |
| 4,421,967 | 12/1983 | Birgel et al. | 219/631 |
| 4,511,777 | 4/1985 | Gerard | 219/631 |
| 4,600,821 | 7/1986 | Fichnter et al. | 219/631 |
| 4,614,853 | 9/1986 | Gerard et al. | 219/631 |
| 4,629,844 | 12/1986 | Griffith et al. | 219/618 |
| 5,012,060 | 4/1991 | Gerard et al. | 219/631 |
| 5,773,798 | 6/1998 | Fukumura | 219/631 |
| 5,914,065 | 6/1999 | Alavi | 219/631 |

*Primary Examiner*—Teresa Walberg
*Assistant Examiner*—Jeffrey Pwu
*Attorney, Agent, or Firm*—Anthony J. Casella; Gerald E. Hespos; Michael J. Porco

[57] ABSTRACT

An apparatus is provided for simultaneously generating a fluid flow and heating the flowing fluid. The apparatus includes a conductive material provided on at least a part of a member which is rotated. The rotatable member generates the flow of the fluid to be heated. Magnets are opposed to one side of the conductive material with a slight gap and are mounted within a casing for the rotatable member. Fluid flows through the casing and is heated due to a slip heat energy generated by rotating the conductive material relative to the magnet.

6 Claims, 14 Drawing Sheets

APPARATUS FOR SIMULTANEOUSLY GENERATING A FLUID FLOW AND HEATING THE FLOWING FLUID

BACKGROUND OF THE INVENTION

1. Field of the Invention

The invention relates to a heating apparatus for a fluid which is used as auxiliary heating means for a fluid such as an engine cooling water used for improving a starting performance of an engine for various kinds of vehicles mainly such as an automotive vehicle having a diesel engine and a gasoline engine as a power source at a time of a cold weather and a severe cold weather and heating a cabin of various kinds of vehicles including an electric vehicle and various kinds of ships, is used for pre-heating and rapidly increasing a temperature (shortening a warming up time) an engine cooling water of an engine driven power generator, a welding machine, a compressor and a construction machine, and is used for an apparatus for force feeding a hot water while increasing a temperature, a heating device of an air conditioning apparatus and a drying device such as a hair dryer, and more particularly to an apparatus for heating a fluid without using a separate heat exchanger and force feeding the fluid by a rotationally driven pump mechanism.

2. Description of the Prior Arts

Conventionally, as an auxiliary heating source for a vehicle such as an automotive vehicle which is used for heating an engine cooling water at a starting time in a cold weather area, there has been known a viscous type heater (refer to Japanese Patent Unexamined Publication Nos. 2-246823, 9-254637, 9-66729 and 9-323530 and Japanese Utility Model Unexamined Publication No. 4-11716).

The viscous type heater is of the type which heats up a viscous fluid such as a silicone oil by shearing so as to exchange heat with a circulating water circulating within a water jacket and utilize for a heating source. The structure is made, for example, such that a heat generating chamber is formed in an inner portion of a housing, the water jacket is formed in an outer area of the heat generating chamber, a drive shaft is rotatably supported to the housing via a bearing apparatus, a rotor capable of rotating within the heat generating chamber is fixed to the drive shaft, a viscous fluid such as a silicone oil is sealed in a gap between a wall surface of the heat generating chamber and the rotor, and a circulating water is circulated so as to be taken into the water jacket from a water inlet port and be fed out to an external heating circuit from a water outlet port.

In this kind of viscous type heater assembled in the heating apparatus of the vehicle, since the rotor is rotated within the heat generating chamber when the drive shaft is driven by an engine, the viscous fluid generates heat due to shearing in the gap between the wall surface of the heat generating chamber and the outer surface of the rotor, the generated heat is exchanged with the circulating water within the water jacket, and the heated circulating water is used for heating the vehicle such as the engine cooling water in the heating circuit.

However, since the viscous type heater mentioned above can realize a compact size and a reduced cost in accordance with a simple structure, can secure a high reliability and safety in accordance with a frictionless non-contact type mechanism, and can automatically stop an operation in accordance with a temperature control when a water temperature is increased and the auxiliary heater is not necessary, there is a feature that a wasteful energy is not used. However, as well as an independent heat exchanging mechanism and heating circuit are required, a temperature of the silicone oil can not be increased sufficiently because a heat resistance of the silicone oil used as the viscous fluid is limited to about 240° C., a lot of time is required before the silicone oil is mixed to be heated to a high temperature at a start time, and an amount of heat generated at a unit time tends to be gradually reduced in accordance that a shearing resistance is lowered due to a reduction of a viscosity when a temperature of the silicone oil is increased, so that there has been a problem that a quick heating effect can not be obtained at an engine cooled time. Accordingly, in particular, in the case of a cold district design vehicle mounting a diesel engine, the viscous type heater mentioned above is not sufficient in an efficiency, so that there has been desired an auxiliary heater installing an apparatus for force feeding the fluid while more quickly and efficiently increasing the temperature of the fluid to a high temperature.

Further, conventionally, a warm and hot air generating apparatus represented by an apparatus for force feeding a warm water while increasing a temperature thereof, a heating device of an air conditioning apparatus and a drying device such as a hair dryer is constituted by a heating source such as a heat exchanger and an electrically heating heater and a force feeding apparatus such as a blower, in which the heating source and the blower are arranged apart from each other at a desired distance. That is, the conventional warm and hot air generating apparatus is generally structured such that the blower is provided in front of the heating source, and an air fed from the blower is heated when passing through the heating source such as the electrically heating heater or warmed so as to be discharged. Here, in the case that the fluid is a liquid, it has been force fed by the pump after being heated by the heat exchanger or heated by the heat exchanger after being force fed by the pump.

However, in this kind of conventional heating and force feeding apparatus, there are the following disadvantages. (1) It is impossible to make the apparatus compact since the force feeding apparatus such as the heating source and the blower is essential, (2) in the case that the electric heating heater is used for the heating means for the air and the water, a heat resistance and a durability are deteriorated since the electric heating heater is weak against moisture and it costs high since it is necessary to insulate the heater, (3) the apparatus is not preferable in view of safety since there is a risk that the electric heating heater fires due to an overheat, and (4) the pump and the heat exchanger are required, and the heat exchanger requires a large exchanging calorie.

SUMMARY OF THE INVENTION

The invention is made by solving the disadvantages in the conventional fluid heating and force feeding apparatus mentioned above, and an object of the invention is to provide a fluid heating and force feeding apparatus which is excellent in heat resistance and durability, rich in safety, can be intended to be made compact by assembling a heating apparatus and a force feeding apparatus, can perform a quick heating, and can be made compact even when being assembled with a heater and a heat exchanger.

In order to achieve the object mentioned above, in accordance with the invention, there is provided a heating and force feeding apparatus for a fluid comprising a conductive material portion provided at least a part of a member which is rotated and apply a velocity energy to the fluid, and magnets opposing to the conductive material portion at a slight gap and mounted within a casing, wherein the fluid within the casing is heated due to a slip heat generated by relatively rotating the velocity energy applying member and the magnets and is applied a velocity energy so as to be force fed, the velocity energy applying member is constituted by a sirocco fan, a multiblade fan, an axial fan, a mixed flow fan, a centrifugal fan or an eddy current fan, or formed by an impeller or a pump wheel, a conductor is mounted to the velocity energy applying member, the magnet and the conductor are arranged in such a manner as to oppose to each other at a slight gap, a whole of the velocity energy applying member is made of a conductive material, the magnet is constituted by a permanent magnet, a thermal ferrite or an electromagnet, and a hysteresis material, a hysteresis material having a surface in the side of the magnet to which an eddy current material or a magnetic material are adhered, or an eddy current material is used for the conductor.

A magnet type heater in the invention is of the type in which the fan, the impeller or the pump wheel having the fixed magnet and the conductor portion are arranged in such a manner as to oppose to each other at a slight gap, and the magnet and the conductor are relatively rotated (including the case that they are inversely rotated to each other) so as to heat the fluid due to the slip heat generated in the conductor. This magnet type heater has a feature that the temperature of the fluid can be increased for a short time, and an excellent heat resistance can be obtained.

The invention is structured such as to integrally combine this magnet type heater with the fan and the impeller, and has a feature that the temperature of the force fed fluid can be increased for a short time, a continuous force feeding can be thereafter performed at a certain temperature and an excellent heat resistance can be obtained.

A first aspect thereof is a heating and force feeding apparatus for a fluid in which a sirocco fan and a magnet type heater are combined, a second aspect thereof is a heating and force feeding apparatus for a fluid in which a centrifugal fan and a magnet type heater are combined, a third aspect thereof is a heating and force feeding apparatus for a fluid in which a multiblade fan and a magnet type heater are combined, a fourth aspect thereof is a heating and force feeding apparatus for a fluid in which an axial fan or a mixed flow fan and a magnet type heater are combined, a fifth aspect is a heating and force feeding apparatus for a fluid which is structured such that a centrifugal fan or a wheel and a magnet type heater are combined and heating can be performed at two portions comprising a flow inlet port side and a discharge port side of the fluid, a sixth aspect is a heating and force feeding apparatus for a fluid in which an eddy current fan (generally referred to as "a vortex fan") and a magnet type heater are combined, and a seventh aspect is a heating and force feeding apparatus for a fluid in which a water pump and a magnet type heater are combined.

In this case, the eddy current fan corresponds to a structure in which a principle of an eddy current pump (a Wesco pump) is applied to a gas, and is principally structured such as to surround an impeller so as to form a ventilation passage by a casing. Accordingly,the air flowing from the suction port generates a pressure increase due to a centrifugal force of the impeller and is pressed out to the ventilation passage, and the air is pressed by the wall of the casing and repeated till the discharge port while generating the vortex movement by means of the next vane, so that the structure has a high pressure wind performance.

That is, in accordance with the invention, the magnet such as the permanent magnet, the thermal ferrite or the electromagnet, the material having a large magnetic hysteresis (hereinafter, refer to as "hysteresis material"), the eddy current material or the magnetic material are constituted by two members of the conductor (the heat generating body) such as the hysteresis member attached to the surface in the side of the magnet or the eddy current material, and these two members are opposed to each other at a slight gap and relatively rotate the magnet and the conductor so as to shear the magnetic path, thereby utilizing a slip heat generated in the side of the conductor. Accordingly, the structure has a feature that it is possible to heat to a temperature of 200 to 600° C. for some seconds to some tens of seconds by using the conductor for the heat generating body. The gap is not particularly limited, however, is generally 0.3 to 1.0 mm.

In this case, "the slip heat generation" mentioned above means that the eddy current is generated within the conductor when moving (rotating) the conductor in a direction of crossing the magnetic field within the magnetic field generated by the magnet, so that a heat is generated due to an electric resistance of the conductor and the eddy current flowing therein.

Further, as ON/OFF control means for the magnet type heater, an electromagnetic clutch and a thermal ferrite can be employed. In this case, the thermal ferrite is generally structured such that a soft ferrite is adhered to the permanent magnet, and corresponds to a magnet having a characteristic that a magnetic path passes through the soft ferrite when generating the heat to a temperature equal to or more than a certain temperature and the magnetic path is formed outside the soft ferrite when the heat generation temperature is inversely reduced to a temperature equal to or less than a certain temperature, so that in the case that the thermal ferrite is used for the magnet, it is possible to automatically perform an ON/OFF control. Accordingly, an ON/OFF control system is not required. Further, it is possible to employ a system for measuring a temperature of the fluid by using a temperature sensor and turning off the electromagnet or weakening a magnetic force at a time of reaching a predetermined temperature so as to control the heat generation amount.

DETAILED DESCRIPTION OF THE PREFERRED EMBODIMENTS

Figure 1:
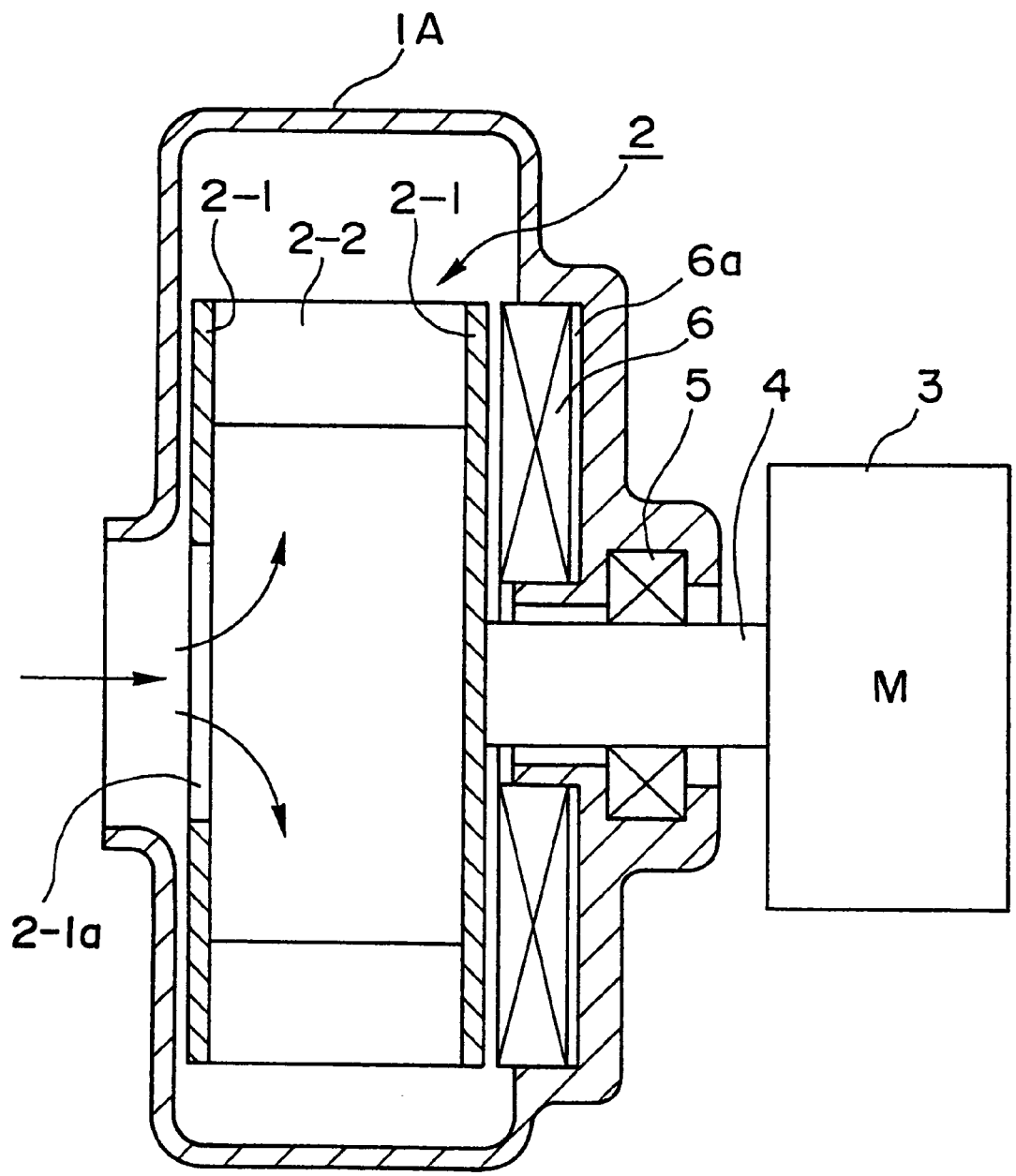
FIG. 1 is a vertical cross sectional side view which shows an embodiment of a heating and force feeding apparatus for a fluid corresponding to a first aspect of the invention.

In the invention, reference numerals 1A to 1K denote a fan casing, reference numeral 2 denotes a sirocco fan, reference numeral 12 denotes a centrifugal fan, reference numeral 12' denotes a wheel, reference numeral 22 denotes a multiblade fan, reference numeral 32 denotes an axial fan, reference numeral 42 denotes a mixed flow fan, reference numeral 52 denotes an eddy current fan (a vortex fan), reference numeral 62 denotes a fan wheel, reference numeral 3 denotes a drive motor, reference numeral 4 denotes a rotational axis, reference numeral 5 denotes a bearing apparatus, reference numeral 6 denotes a permanent magnet, reference numeral 6-1 denotes an electromagnet, reference numerals 7, 17, 27, 37, 47 and 57 denote a magnet supporting body, reference numeral 8 denotes a compressor disc, reference numeral 8-1 denotes a compressor blade, reference numeral 9 denotes a stator segment, reference numeral 9-1 denotes a stator, reference numeral 10 denotes a pulley, reference numeral 11 denotes an electricity supplying cable, and reference numeral 63 denotes a cylinder block.

That is, FIG. 1 exemplifies a heating and force feeding apparatus for a fluid in accordance with a first aspect of the invention in which a sirocco fan and a magnet type heater are combined. The apparatus is structured such that a plate of the sirocco fan is made of a conductive material, a permanent magnet arranged in such a manner as to oppose to the conductive plate with a little gap is assembled in the fan casing, and a fluid within the fan casing is heated due to a slip heat generated in the plate in accordance with a rotation of the plate. In the exemplified structure, a rotating vane is constituted by a donut-like plate 2-1 having a suction hole 2-1a pierced in a center thereof, a disc-like plate 2-1 and a plurality of blades 2-2 horizontally provided between both plates 2-1, the sirocco fan 2 is structured such as to support the rotating vane to the rotational axis 4 of the drive motor 3 via the bearing apparatus 5 within the fan casing 1A, and the disc-like plate 2-1 of the sirocco fan 2 is made of a conductive material. The donut-like permanent magnet 6 opposing to the conductive material plate 2-1 at a little gap is mounted within the fan casing 1A via a yoke 6a. In this case, the conductive material plate is structured such that an eddy current material or a magnetic material is adhered to a surface of a base material such as the hysteresis material or the iron plate in the side of the permanent magnet 6, or structured by the eddy current material itself.

In the fluid heating and force feeding apparatus having the structure mentioned above, when energizing the drive motor 3, at the same time when the fluid flowing into the fan casing 1A flows as shown by an arrow, the magnetic path formed between the conductive material plate 2-1 and the permanent magnet 6 mounted to the fan casing 1A is shut off, so that the slip heat is generated in the conductive material plate 2-1. The heat generated in the conductive material plate 2-1 is exchanged with the fluid flowing within the fan casing 1A through the plate and the blade 2-2 to which the heat is transmitted from the plate, thereby becoming a warm air or a hot air and being discharged from a discharge port (not shown).

Figure 2:
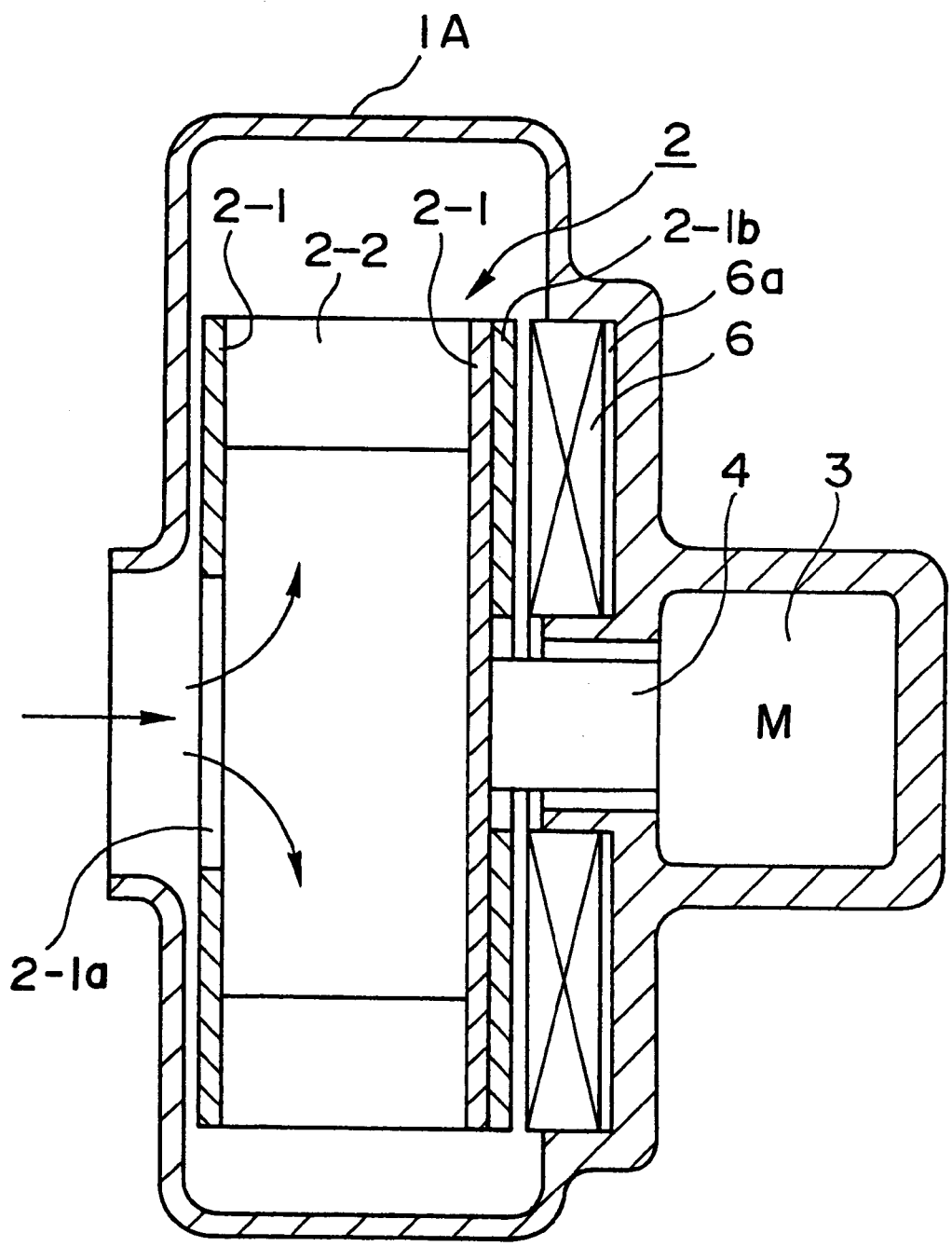
FIG. 2 is a vertical cross sectional side view which shows another embodiment of a heating and force feeding apparatus for a fluid corresponding to the aspect mentioned above.

Further, the fluid heating and force feeding apparatus shown in FIG. 2 is structured such that in the fluid heating and force feeding apparatus shown in FIG. 1, the disc-like plate 2-1 is made of a nonconductive material, a donut-like conductor 2-1b is attached to the nonconductive material disc-like plate 2-1 and a heat generated in the conductor 2-1b heats the fluid flowing within the fan casing 1A.

Figure 3:
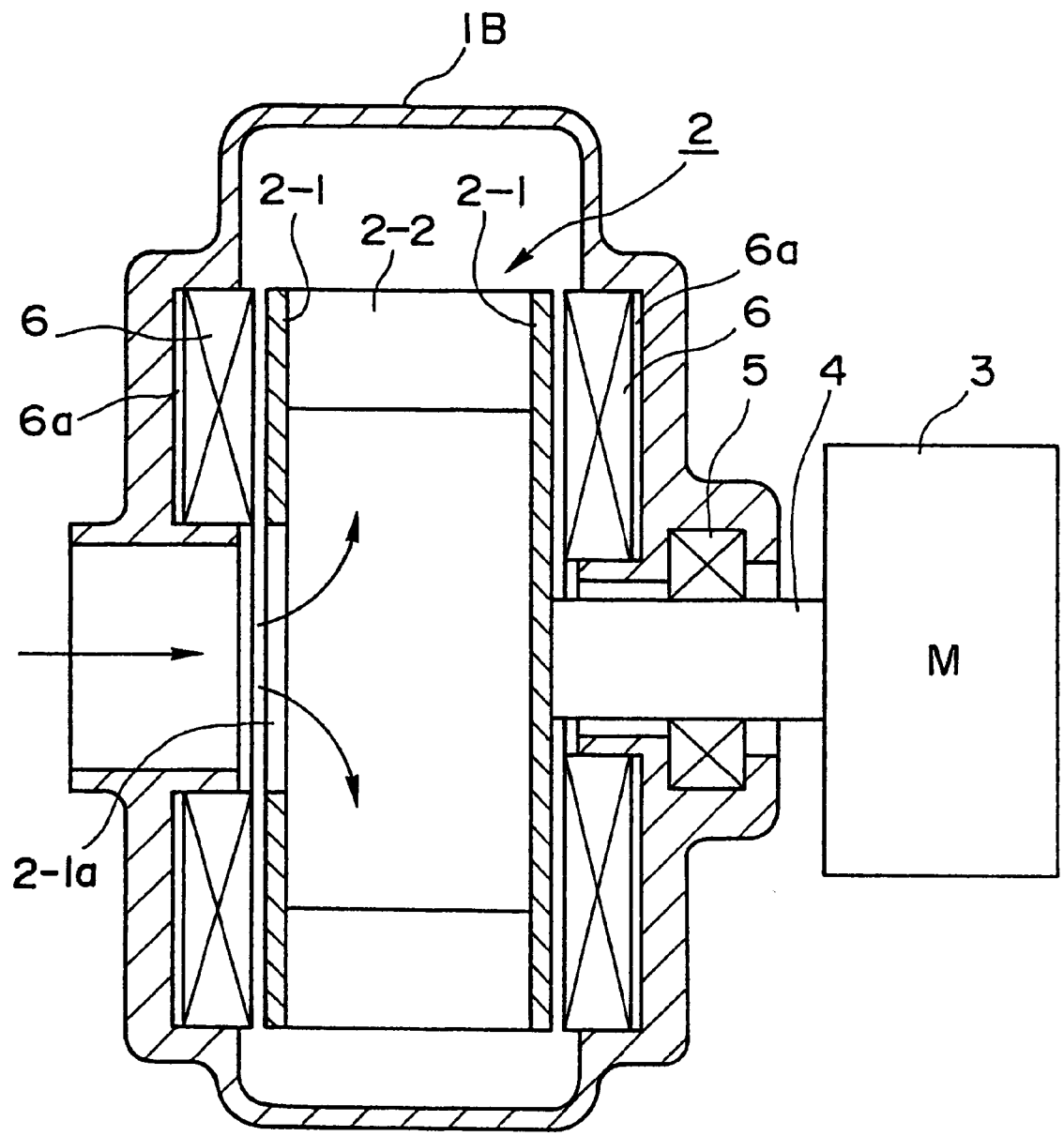
FIG. 3 is a vertical cross sectional side view which shows the other embodiment of a heating and force feeding apparatus for a fluid corresponding to the aspect mentioned above.

Still further, the fluid heating and force feeding apparatus shown in FIG. 3 is structured such that the magnet type heaters of the fluid heating and force feeding apparatus shown in FIG. 1 are doubly employed, that is, both of the plates 2-1 of the rotating vane which is constituted by the donut-like plate 2-1 having the suction hole 2-1a pierced in a center thereof, the disc-like plate 2-1 and a plurality of blades 2-2 horizontally provided between both plates 2-1, are made of a conductive material. The donut-like permanent magnet 6 opposing to each of the conductive material plates 2-1 at a little gap is assembled within the fan casing 1B via a yoke 6a. Accordingly, in this fan, the slip heat generated in both of the conductive material plates 2-1 is exchanged with the fluid flowing within the fan casing 1B, thereby becoming a warm air or a hot air and being discharged from a discharge port (not shown).

Figure 4:
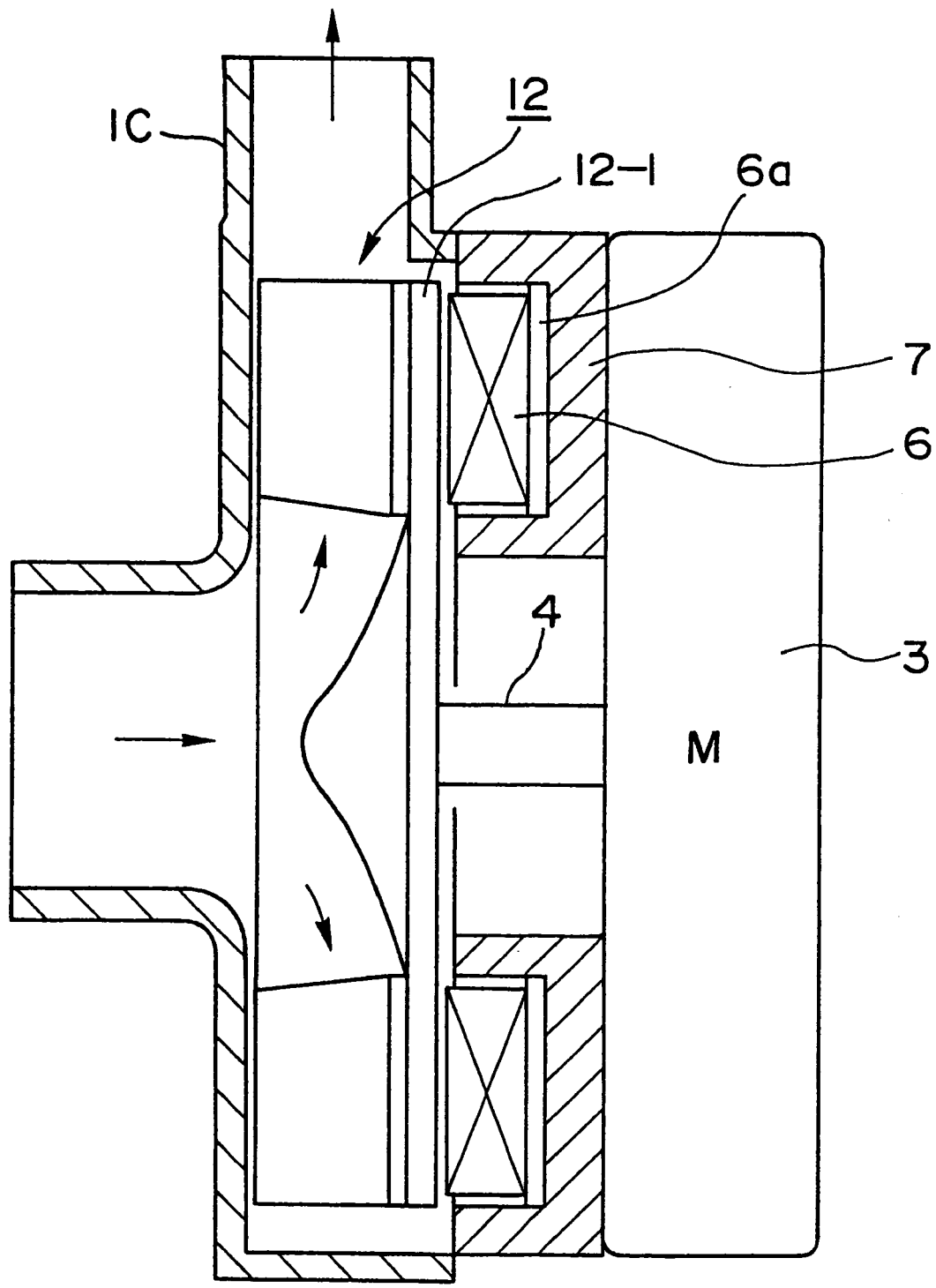
FIG. 4 is a vertical cross sectional side view which shows an embodiment of a heating and force feeding apparatus for a fluid corresponding to a second aspect of the invention.

Next, FIG. 4 exemplifies a fluid heating and force feeding apparatus employing a centrifugal fan in accordance with a second aspect of the invention. The fan is structured such that a conductor is mounted to the rotational vane or the rotational vane is made of a conductive material, a permanent magnet arranged in such a manner as to oppose to the conductor or the conductive material rotational vane at a little gap is assembled in the pump main body, and the fluid within the fan is heated by the slip heat generated in the conductor due to the rotation of the rotational vane. The exemplified apparatus is structured such that a back plate 12-1 of the centrifugal fan 12 mounted to the rotational axis 4 of the drive motor 3 within a fan casing 1C is made of a conductive material, the annular magnet supporting body 7 opposing to the conductive material back plate 12-1 at a little gap is mounted to the fan casing 1C, and the drive motor 3 is mounted on a back surface of the magnet supporting body 7. The donut-like permanent magnet 6 is mounted to the magnet supporting body 7 via the yoke 6a. In this case, as well as the structure shown in FIG. 1, the conductive material back plate 12-1 is structured such that the eddy current material or the magnetic material is adhered to the surface of the base material such as the hysteresis material or the iron plate in the side of the permanent magnet 6, or constructed by the eddy current material itself.

In the fluid heating and force feeding apparatus having the structure mentioned above, when energizing the drive motor 3, at the same time when the fluid flowing into the fan casing 1C flows as shown by an arrow, the magnetic path formed between the conductive material back plate 12-1 and the permanent magnet 6 of the magnet supporting body 7 mounted to the fan casing 1C is shut off, so that the slip heat is generated in the conductive material back plate 12-1. The heat generated in the conductive material back plate 12-1 is exchanged with the fluid flowing within the fan casing 1C through each of the rotational vanes, thereby becoming a warm air or a hot air and being discharged from a discharge port.

Figure 5:
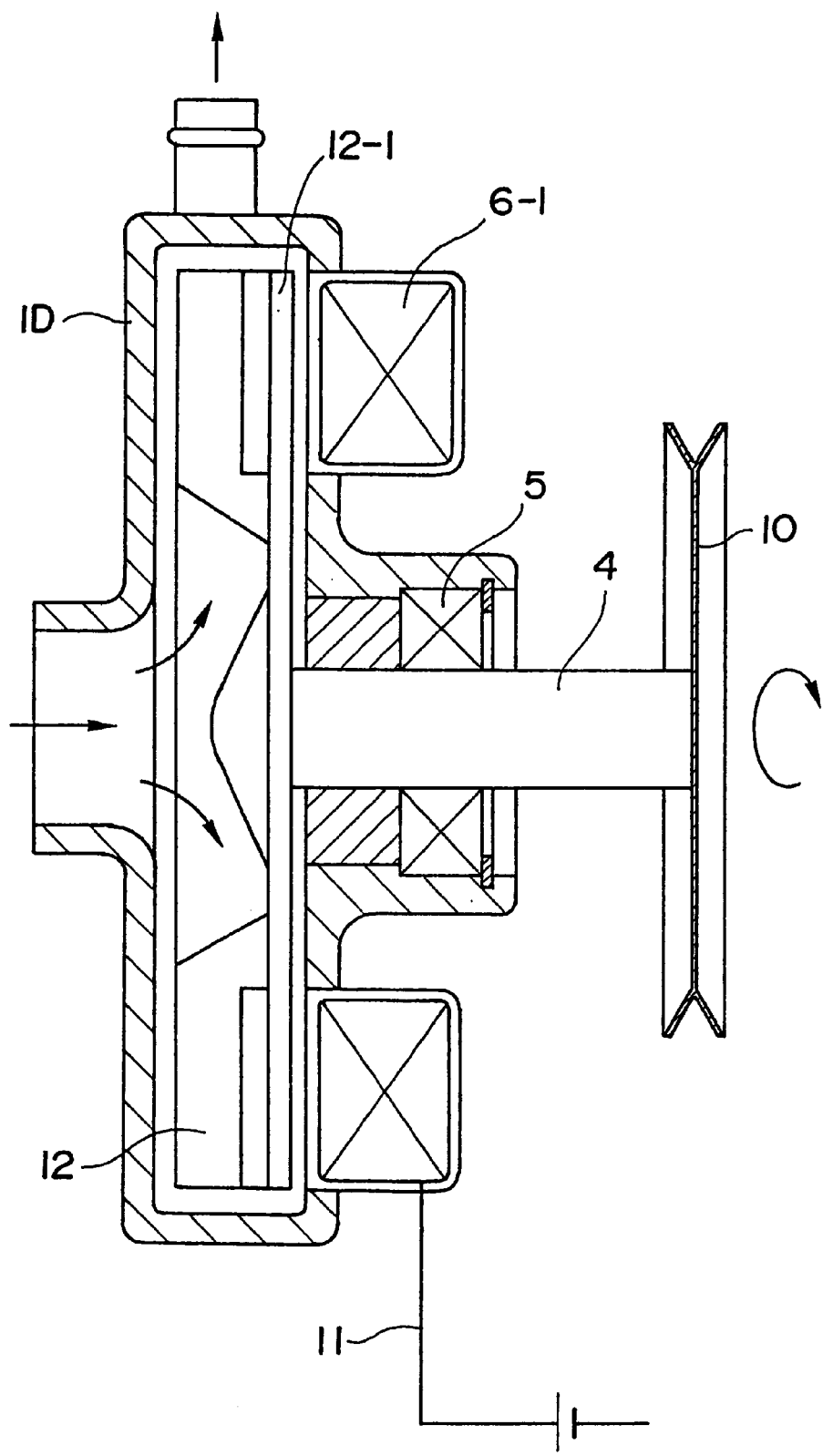
FIG. 5 is a vertical cross sectional side view which shows another embodiment of a heating and force feeding apparatus for a fluid corresponding to the second aspect of the invention.

FIG. 5 exemplifies a system structured such that an electromagnet is used in place of the permanent magnet 6 of the fluid heating and force feeding apparatus shown in FIG. 4 mentioned above and a slip heat is generated in the conductor in the side of the rotation by the electromagnet. The structure of the heating and force feeding apparatus is made such that the centrifugal fan 12 is mounted to the rotational axis 4 within a fan casing 1D supported to an outer periphery of the rotational axis 4 via the bearing apparatus 5, an electromagnet 6-1 opposing to the conductive material back plate 12-1 of the centrifugal fan 12 at a little gap is mounted to the fan casing 1D, the rotational axis 4 is driven by the motor or the engine via the pulley 10 or a belt (not shown), and the electromagnet 6-1 is energized by the power supplying cable 11. In this case, the conductive material back plate 12-1 is structured such that the eddy current material or the magnetic material is adhered to the surface of the base material such as the hysteresis material or the iron plate in the side of the permanent magnet 6 or constructed by the eddy current material itself in the same manner as that shown in FIG. 1.

In the fluid heating and force feeding apparatus having the structure shown in FIG. 5, when the rotational axis 4 is. driven by the motor or the engine via the pulley 10 and a belt (not shown), at the same time the fluid flowing into the fan casing 1D flows as shown by an arrow, the magnetic path formed between the conductive material back plate 12-1 and the electromagnet 6 mounted to the fan casing 1D is shut off, so that the slip heat is generated in the conductive material back plate 12-1. The heat generated in the conductive material back plate 12-1 is exchanged with the fluid flowing within the fan casing 1D through each of the blades in the rotational vane, thereby becoming a warm air or a hot air and being discharged from a discharge port.

Figure 6:
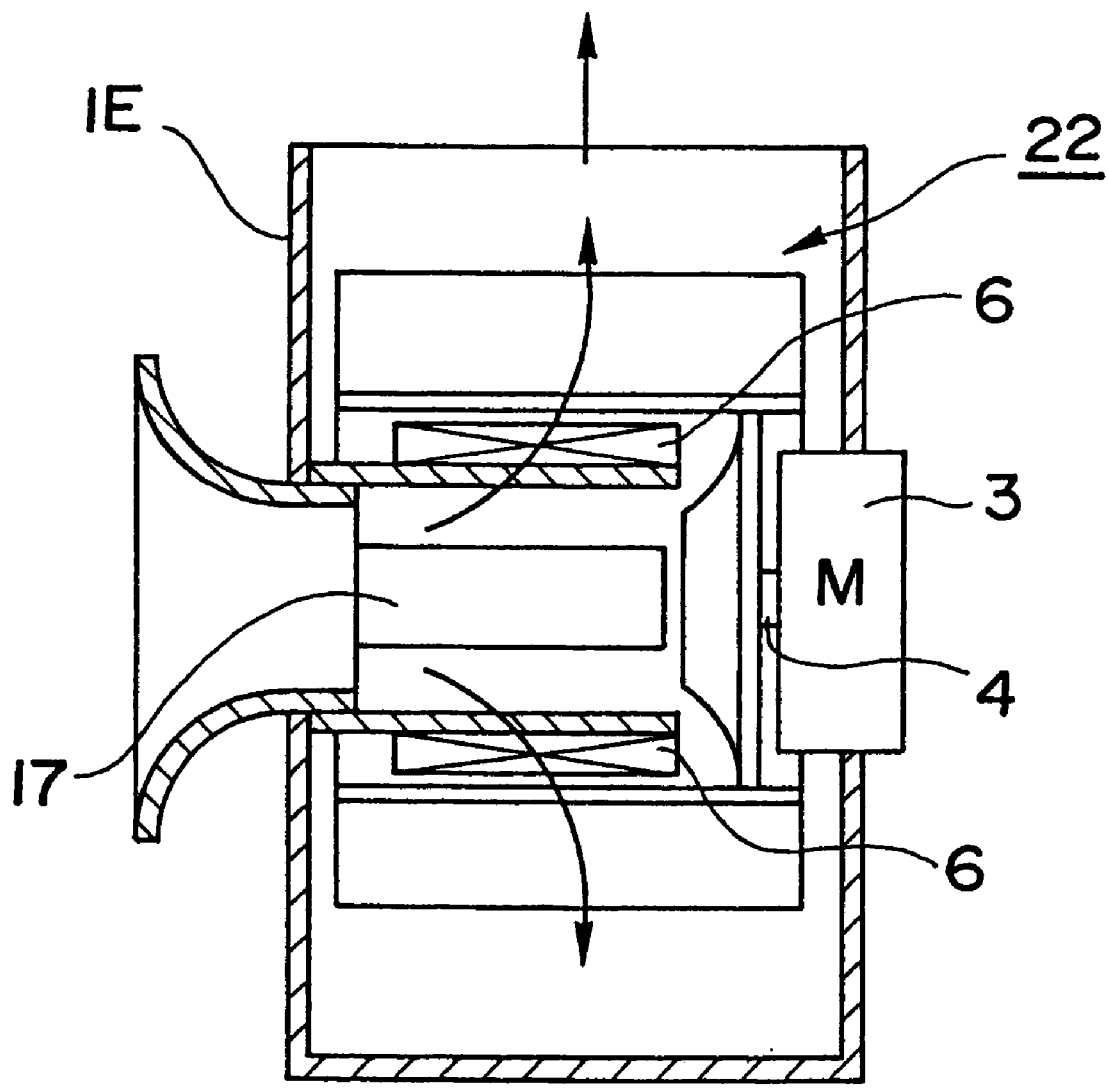
FIG. 6 is a vertical cross sectional side view which shows an embodiment of a heating and force feeding apparatus for a fluid corresponding to a third aspect of the invention.

FIG. 6 exemplifies a fluid heating and force feeding apparatus using a multiblade fan in accordance with a third aspect of the invention, in which the structure is made such that a cylindrical multiblade fan 22 mounted to the rotational axis 4 of the drive motor 3 provided in the back surface side of a fan casing 1E is made of a conductive material, and a plurality of plate-like magnet supporting bodies 17 opposing to the fan at a little gap are provided on an inner wall of the fan casing 1E in the side of a fluid inlet port within the cylindrical multiblade fan 22 in a projecting manner. In the same manner, an arc-plate shaped permanent magnet 6 is adhered to the magnet supporting body 17. In this case, as well as the structure shown in FIG. 1, the conductive material multiblade fan 22 is structured such that the eddy current material or the magnetic material is adhered to the surface of the base material such as the hysteresis material or the iron plate in the side of the permanent magnet 6, or constructed by the eddy current material itself.

In the fluid heating and force feeding apparatus having the structure mentioned above, when energizing the drive motor 3, at the same time when the fluid flowing into the fan casing 1E flows as shown by an arrow, the magnetic path formed between the conductive material cylindrical multiblade fan 22 and the permanent magnet 6 of the magnet supporting body 17 mounted to the fan casing 1E is shut off, so that the slip heat is generated in the conductive material cylindrical multiblade fan 22. The heat generated in the conductive material cylindrical multiblade fan 22 is exchanged with the fluid flowing within the fan casing 1E, thereby becoming a warm air or a hot air and being discharged from a discharge port.

Figure 7:
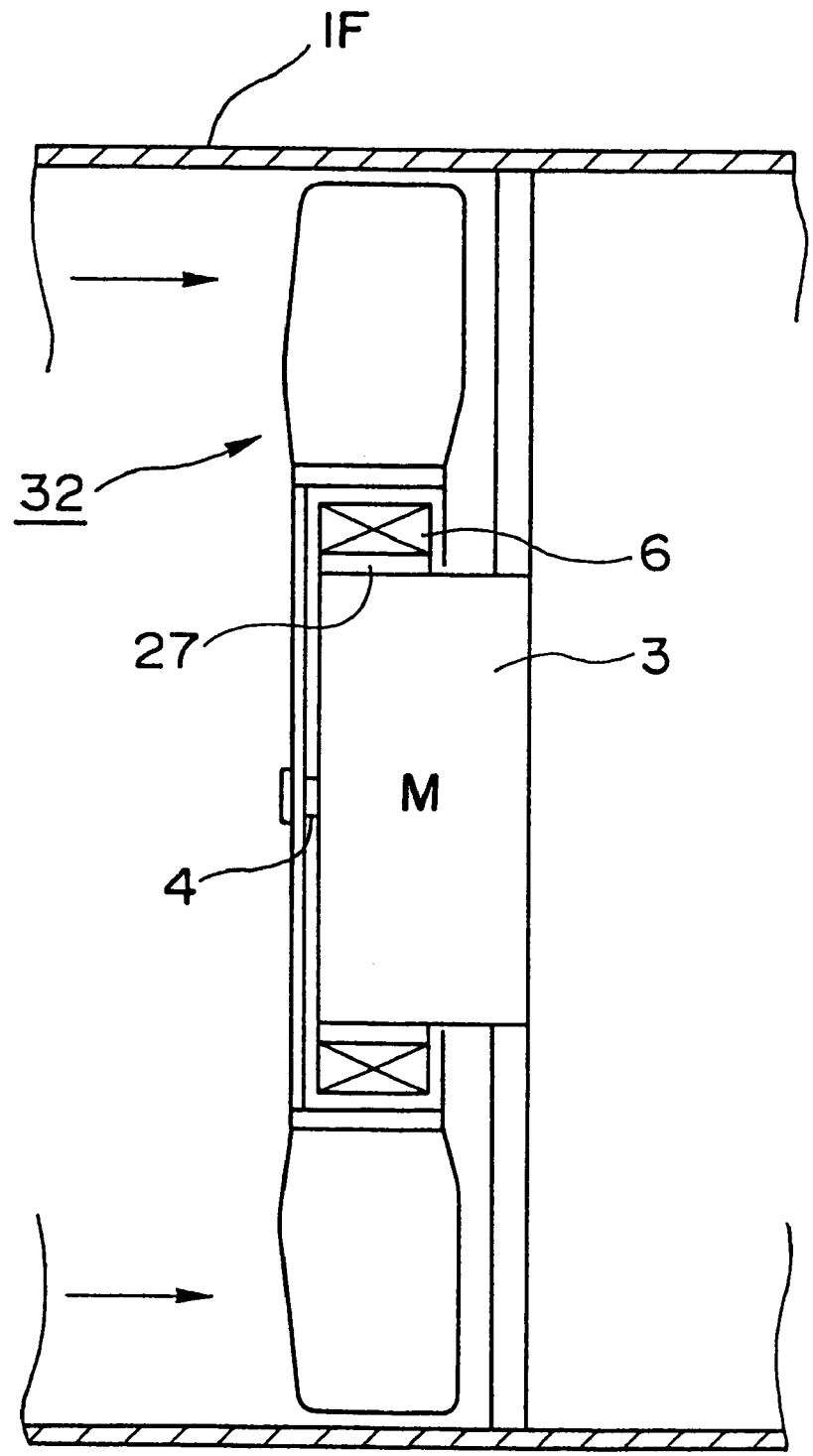
FIG. 7 is a vertical cross sectional side view which shows an embodiment of a heating and force feeding apparatus for a fluid corresponding to a fourth aspect of the invention.

FIG. 7 exemplifies a fluid heating and force feeding apparatus using an axial fan in accordance with a fourth aspect, in which the structure is made such that an axial fan 32 mounted to the rotational axis 4 of the drive motor 3 provided in the back surface side of a fan casing 1F is made of a conductive material, a plurality of magnet supporting bodies 27 opposing to the axial fan 32 at a little gap are provided on an outer periphery of the drive motor 3, and the permanent magnet 6 is mounted to the magnet supporting body 27. In this case, as well as the structure shown in FIG. 1, the conductive material axial fan 32 is structured such that the eddy current material or the magnetic material is adhered to the surface of the base material such as the hysteresis material or the iron plate in the side of the permanent magnet, or constructed by the eddy current material itself.

In the fluid heating and force feeding apparatus having the structure mentioned above, when energizing the drive motor 3, at the same time when the fluid flowing into the fan casing 1F flows as shown by an arrow, the magnetic path formed between the conductive material axial fan 32 and the permanent magnet 6 of the magnet supporting body 27 mounted to the outer periphery of the drive motor 3 is shut off, so that the slip heat is generated in the conductive material axial fan 32. The heat generated in the conductive axial fan 32 is exchanged with the fluid flowing within the fan casing 1E, thereby becoming a warm air or a hot air and being discharged from a discharge port.

Figure 8:
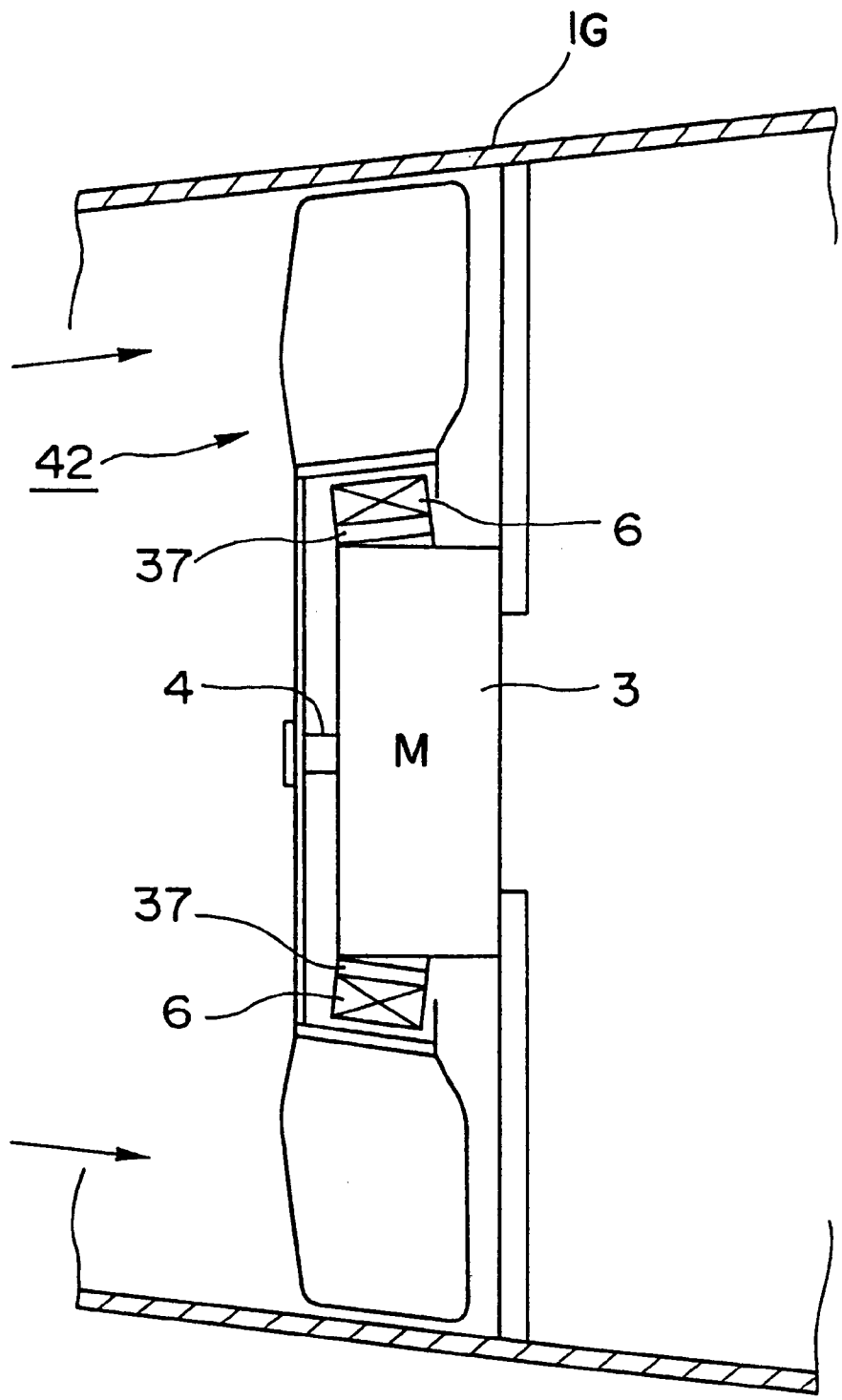
FIG. 8 is a vertical cross sectional side view which shows another embodiment of a heating and force feeding apparatus for a fluid corresponding to the fourth aspect of the invention.

Further, FIG. 8 exemplifies a fluid heating and force feeding apparatus using a mixed flow fan and the structure thereof is the same as that of the fluid heating and force feeding apparatus using the axial fan shown in FIG. 7 mentioned above. That is, the structure is made such that a mixed flow fan 42 mounted to the rotational axis 4 of the drive motor 3 provided within a fan casing 1G is made of a conductive material, and a plurality of magnet supporting bodies 37 opposing to the mixed flow fan 42 at a little gap are obliquely fixed to an outer periphery of the drive motor 3 so as to correspond to an incline of the mixed flow fan 42 and the permanent magnet 6 is mounted to the magnet supporting body 37. In this case, as well as the structure shown in FIG. 1, the conductive material axial fan 42 is structured such that the eddy current material or the magnetic material is adhered to the surface of the base material such as the hysteresis material or the iron plate in the side of the permanent magnet, or constructed by the eddy current material itself.

An operation of the fluid heating and force feeding apparatus having the structure mentioned above is the same as that of the fluid heating and force feeding apparatus using the axial fan shown in FIG. 7. Accordingly, when energizing the drive motor 3, at the same time when the fluid flowing into the fan casing 1G flows as shown by an arrow, the magnetic path formed between the conductive material mixed flow fan 42 and the permanent magnet 6 of the magnet supporting body 37 mounted to the drive motor 3 is shut off, so that the slip heat is generated in the conductive material mixed flow fan 42. The heat generated in the conductive material mixed flow fan 42 is exchanged with the fluid flowing within the fan casing 1G, thereby becoming a warm air or a hot air and being discharged from a discharge port.

Figure 9:
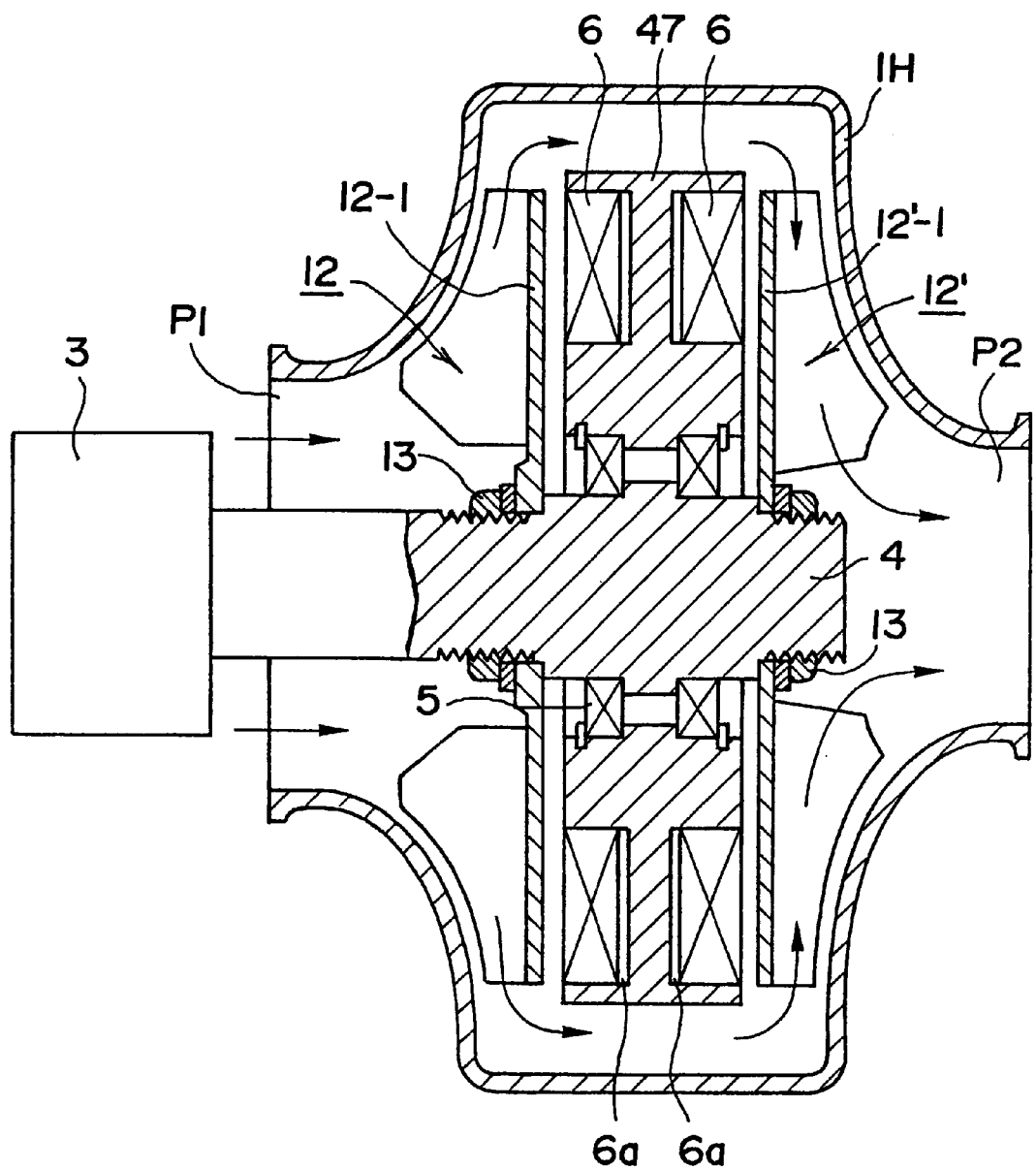
FIG. 9 is a vertical cross sectional side view which shows an embodiment of a heating and force feeding apparatus for a fluid corresponding to a fifth aspect of the invention.

FIG. 9 exemplifies a fluid heating and force feeding apparatus using a centrifugal fan and a wheel in accordance with a fifth aspect, in which the structure is made such that a heating can be performed at two portions comprising a flow inlet side and a discharge port of the fluid. Accordingly, the exemplified structure is made such that back plates 12-1 and 12'-1 of the centrifugal fan 12 and a wheel 12' which are mounted to the rotational axis 4 of the drive motor 3 in a fluid flow inlet port P1 side and a fluid discharge port P2 side of a fan casing 1H by means of a fastening nut 13 are made of a conductive material, and an annular magnet supporting body 47 opposing to the conductive material back plates 12-1 and 12'-1 at a little gap is provided to the same rotational axis 4 as that mentioned above via the bearing apparatus 5 between the centrifugal fan 12 and the wheel 12' in such a manner as not to rotate. The donut-like permanent magnet 6 is mounted to the magnet supporting body 47 via the yoke 6a.

In the fluid heating and force feeding apparatus having the structure mentioned above, when energizing the drive motor 3, at the same time when the fluid flowing into the fan casing 1H from the flow inlet port P1 flows as shown by an arrow, the magnetic path formed between the conductive material back plate 12-1 in the flow inlet port P1 side and the permanent magnet 6 of the magnet supporting body 47 mounted to the rotational axis 4 is shut off, so that the slip heat is generated in the conductive material back plate 12-1 and is exchanged with the fluid flowing through the flow inlet port P1 side within the fan casing 1H. Subsequently, the fluid becoming a warm air or a hot air is again heated by the heat generated in the discharge port side wheel 12' and the conductive material back plate 12'-1 in the side of the discharge port P2 of the fan casing 1I, and is discharged from the discharge port P2 as a fluid having a higher temperature. In the case of this fluid heating and force feeding apparatus having a so-called double structure, it is possible to make a temperature difference between the flow inlet port P1 side and the discharge port P2 side of the fluid large by a little air amount.

Figure 10:
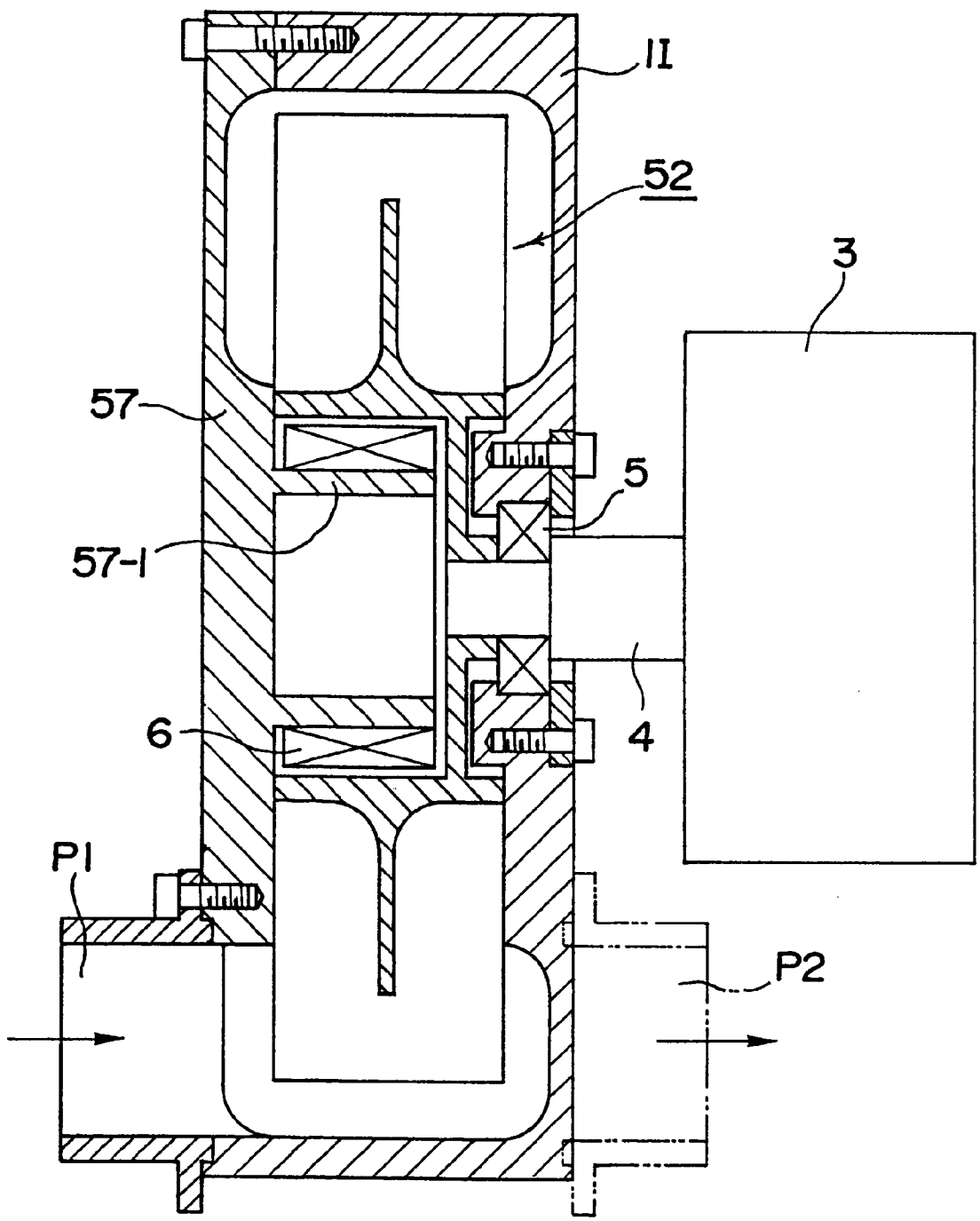
FIG. 10 is a vertical cross sectional side view which shows an embodiment of a heating and force feeding apparatus for a fluid corresponding to a sixth aspect of the invention.

A fluid heating and force feeding apparatus shown in FIG. 10 corresponds to a combination of the eddy current fan (the vortex fan) in accordance with the sixth embodiment and the magnet type heater, in which the structure is made such that an eddy current fan 52 rotatably mounted to the rotational axis 4 of the drive motor 3 provided in the back surface side of a fan casing 1I via the bearing apparatus 5 within the fan casing 1I is made of a conductive material, and a magnet supporting body 57 to which the permanent magnet 6 is adhered on an outer peripheral surface of a cylindrical portion 57-1 opposing to the fan at a little gap is mounted to a front surface side of the non-rotational fan casing 1I within the eddy current fan 52. In this case, as well as the structure shown in FIG. 1, the conductive material eddy current fan 52 is structured such that the eddy current material or the magnetic material is adhered to the surface of the base material such as the hysteresis material or the iron plate in the side of the permanent magnet 6, or constructed by the eddy current material itself.

In the fluid heating and force feeding apparatus having the structure shown in FIG. 10 mentioned above, when energizing the drive motor 3, at the same time when the fluid flowing into the fan casing 1I from the flow inlet port P1 flows as shown by an arrow, the magnetic path formed between the conductive material eddy current fan 52 and the permanent magnet 6 of the non-rotational magnet supporting body 57 is shut off, so that the slip heat is generated in the conductive material eddy current fan 52 and is exchanged with the fluid flowing within the fan casing 1I, thereby becoming a warm air or a hot air and being discharged from the discharge port P2.

Figure 11:
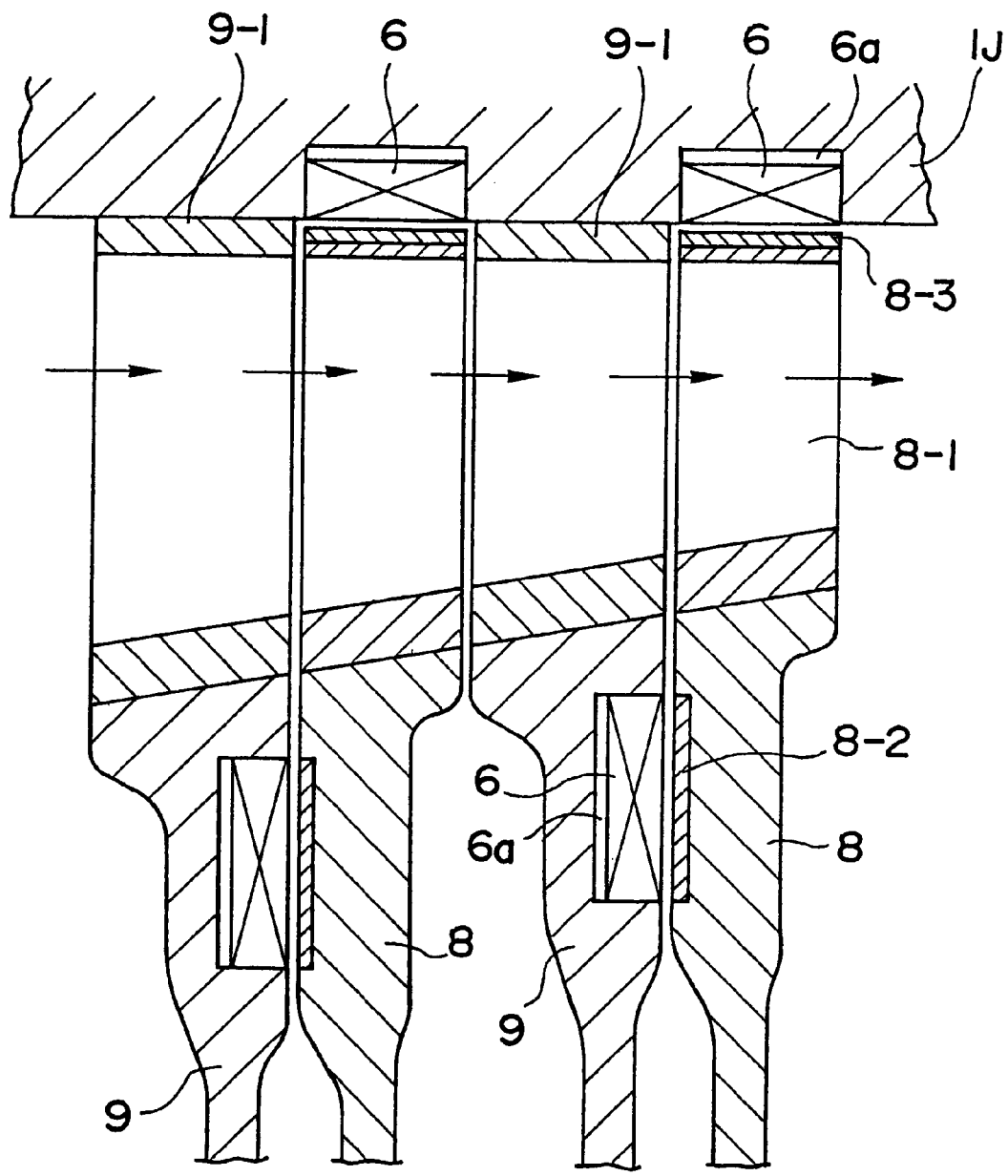
FIG. 11 is a vertical cross sectional side view of a main portion which shows an embodiment of a heating and force feeding apparatus for a fluid applied to a turbine engine having a multi stage compressor.

A fluid heating and force feeding apparatus shown in FIG. 11 is structured such that a permanent magnet 6 arranged in such a manner as to oppose to a conductor 8-2 mounted to a side surface in the side of the stator side of the compressor disc 8 at a little gap is mounted to an inner side of the stator segment 9 via the yoke 6a, and the permanent magnet 6 arranged in such a manner as to oppose to a conductor 8-3 mounted to an outer peripheral surface of a compressor blade 8-1 at a little gap is mounted to a fan casing 1J via the yoke 6a. In this case, as well as the structure shown in FIG. 1, the conductors 8-2 and 8-3 mentioned above is structured such that the eddy current material or the magnetic material is adhered to the surface of the base material such as the hysteresis material or the iron plate in the side of the permanent magnet, or constructed by the eddy current material itself.

In the case of the fluid heating and force feeding apparatus having the structure mentioned above, when the turbine is rotated, at the same time when a fluid (an air) force fed to a combustion chamber (not shown) flows as shown by an arrow, the magnetic path formed between the conductor 8-3 mounted to an outer peripheral surface of the compressor blade 9-1 and the permanent magnet 6 mounted to a fan casing 1J is shut off, so that the outer peripheral surface of the compressor blade 9-1 is heated by the slip heat generated thereby. Further, the magnetic path formed between the conductor 8-2 mounted to an outer side of the compressor disc 8 and the permanent magnet 6 mounted to the inner side of the stator segment 9 is shut off, so that the compressor disc 8 is heated by the slip heat generated thereby, and the fluid force fed to the combustion chamber is previously heated.

Figure 12:
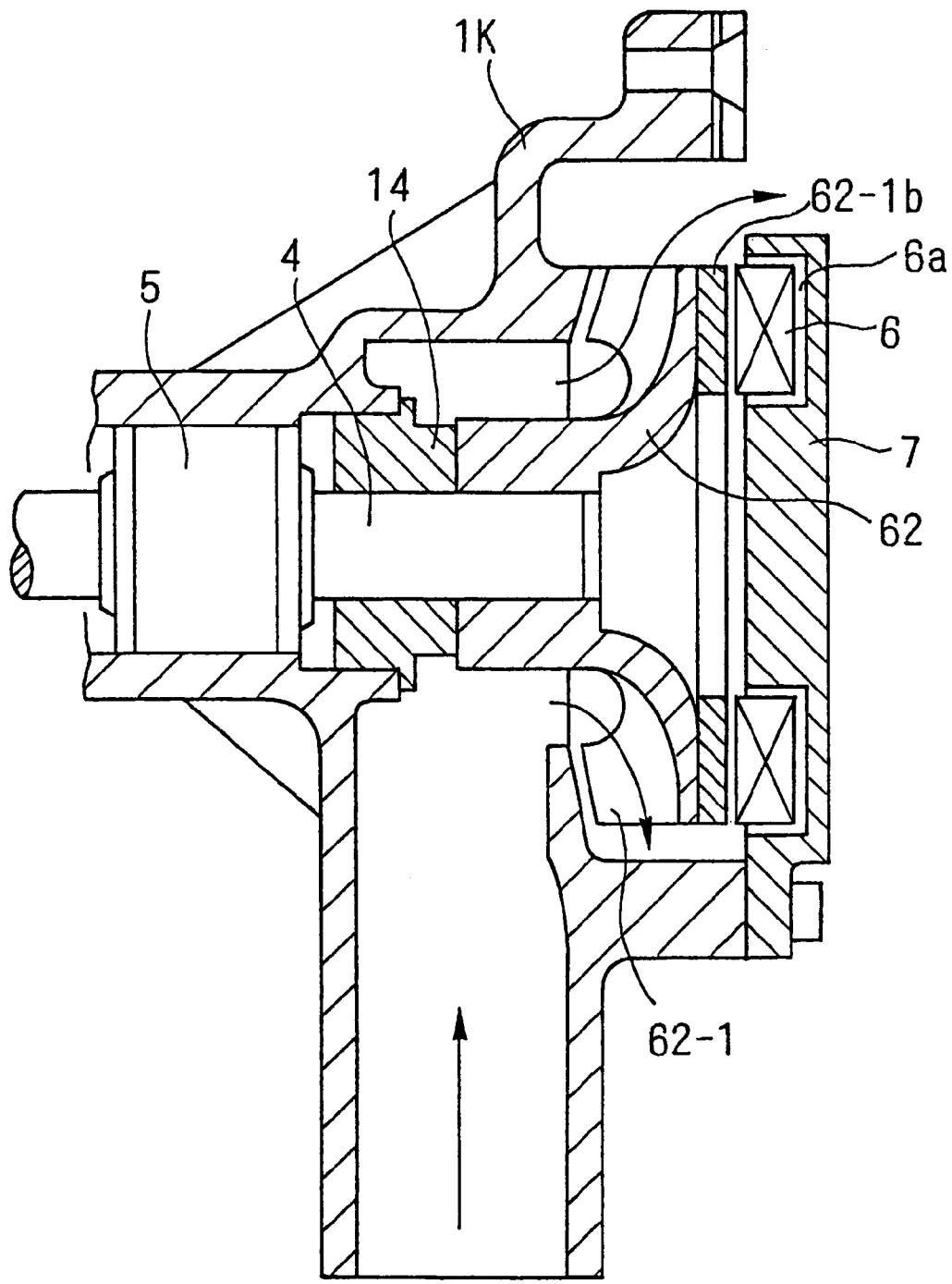
FIG. 12 is a vertical cross sectional side view which shows an embodiment of a heating and force feeding apparatus for a fluid corresponding to a seventh aspect of the invention.

FIG. 12 exemplifies a fluid heating and force feeding apparatus using a water pump in accordance with a seventh aspect of the invention, in which the structure of the heating and force feeding apparatus is made such that it is mounted to an outer periphery of the rotational axis 4 via the bearing 5 and a mechanical seal 14, a fan wheel 62 is mounted to the rotational axis 4 within a fan casing 1K, a conductor 62-1b opposing to the permanent magnet 6 at a little gap is adhered to a surface of an impeller 62-1 disposed in the outer periphery of the fan wheel 62, and the rotational axis 4 is driven by a pulley, a belt, a motor or an engine (not shown). When the rotational axis 4 is driven, at the same time when the fluid such as an engine cooling water flows as shown by an arrow due to an operation of the impeller 62-1, the magnetic path formed between the conductor 62-1b mounted to a back surface of the pump wheel 62 and the permanent magnet 6 mounted to the permanent magnet body 7 mounted to the fan casing 1K via the yoke 6a is shut off, so that the slip heat is generated in the conductor 62-1b.

The heat generated in the conductor 62-1b is exchanged with the fluid flowing through the impeller 62-1 within the fan casing 1K, thereby becoming a liquid having an increased temperature and being discharged from a discharge port.

Figure 13:
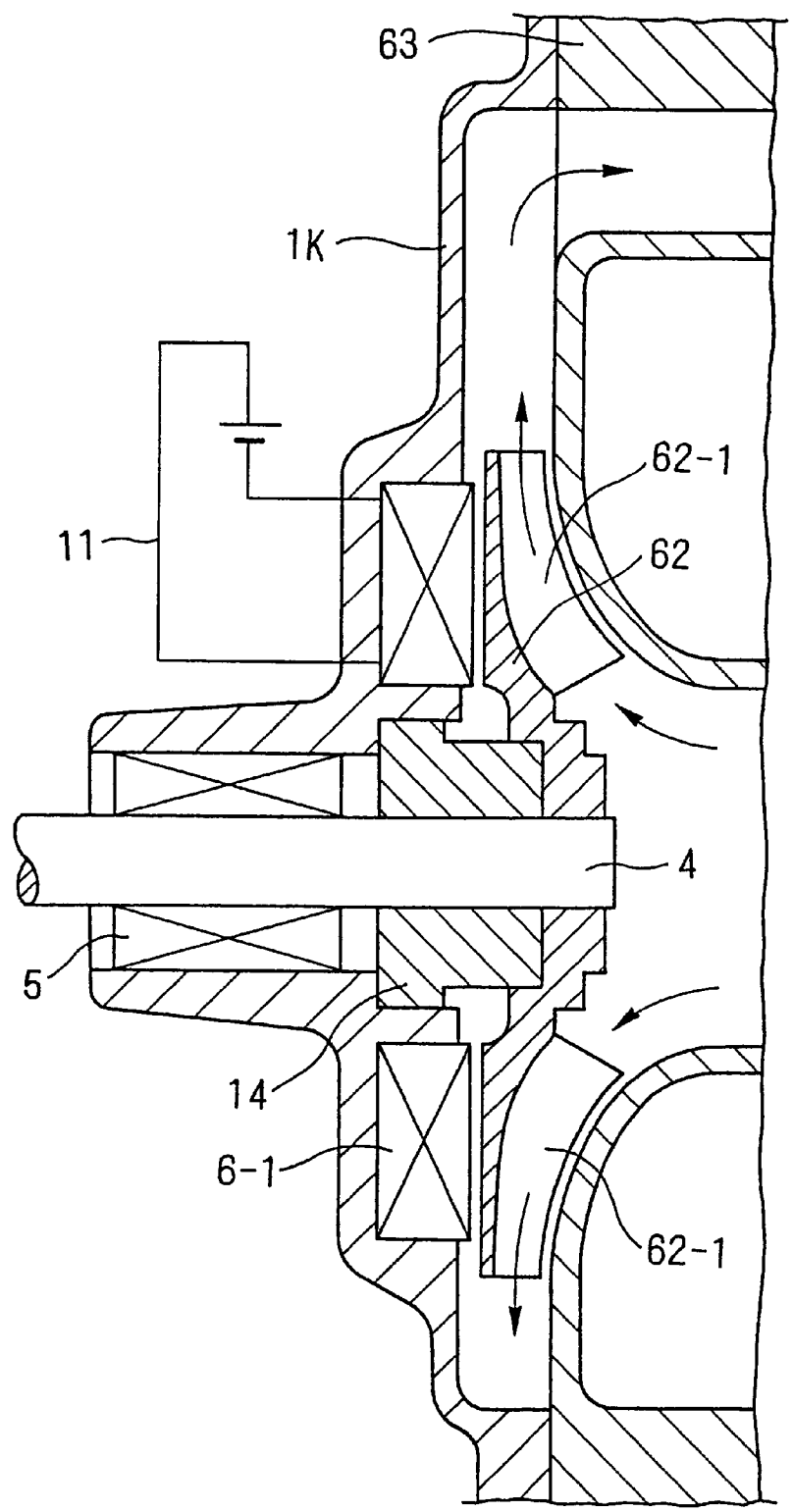
FIG. 13 is a vertical cross sectional side view which shows another embodiment of a heating and force feeding apparatus for a fluid corresponding to the seventh aspect of the invention.

Next, in a water pump of the engine shown in FIG. 13, there is shown a system in which the structure is made such that an electromagnet is employed in place of the permanent magnet, the pump wheel in the rotating side is made of a conductive material, and a slip heat is generated in the fan casing 1K itself. In this case, the structure is made such that as well as an electromagnet 6-1 is assembled within the fan casing 1K and a power supply cable 11 is connected to the electromagnet 6-1 so as to supply power to the electromagnet 6-1, the conductive material pump wheel 62 is mounted to a distal end of the rotational axis 2 rotatably supported within the fan casing 1K via the bearing apparatus 5 and the mechanical seal 14 at a little gap with respect to the electromagnet 6-1. In this case, the magnetic path formed between the conductive material pump wheel 62 and the electromagnet 6-1 assembled within the fan casing 1K is shut off, so that the slip heat is generated in the pump wheel 62, the generated heat is mainly discharged from the impeller 62-1, and the liquid exchanged with the engine cooling water flowing within the fan casing 1K and having an increased temperature is introduced into the cylinder block 63. In this case, when the eddy current material such as a copper plate is adhered to the opposing surface of the electromagnet 6-1 of the conductive pump wheel 62, a heat generating effect can be improved.

Figure 14:
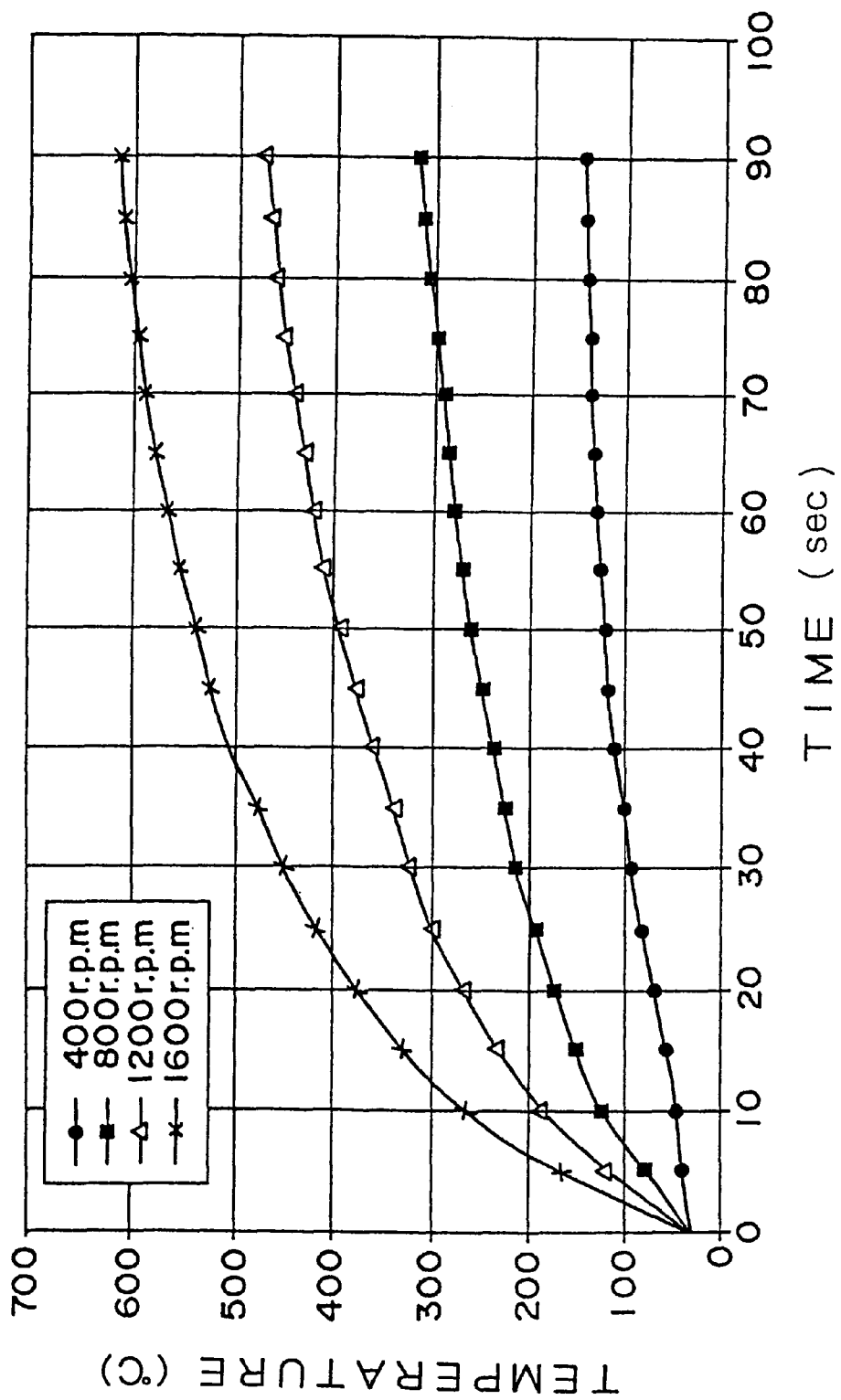
FIG. 14 is a graph which shows an example of a heat generation data between a rare earth magnet and an eddy current material experimentally performed by the inventors.

FIG. 14 exemplifies a heat generation data on the basis of a combination of a rare earth magnet and an eddy current material experimentally performed by the inventors, and the data shows a relation between a time (sec) and a temperature which are measured by arranging the rare earth permanent magnet and the eddy current material in an opposed manner with setting a gap therebetween to 1.0 mm and variously changing a rotating speed in the side of the magnet in a state of fixing the eddy current material.

In accordance with the data, it can be understood that a slip heat having a temperature of 200 to 600° C. is generated in the conductor for some seconds to some tens of seconds by arranging the magnet and the conductive body in an opposed manner at a little gap and relatively rotating the magnet and the conductor.

In each of the embodiments mentioned above, the description is given of the structure in which the conductor having the fan or the impeller or the wheel is rotated, the magnet is fixed within the casing and both of them are relatively rotated. However, the structure can be modified, for example, such that the magnet side is rotated by the independently provided drive motor so as to control the relative rotational speed of the both to achieve a speed increase, a speed reduction and an inverse rotation, thereby capable of controlling a calorie, or the both can be inversely rotated to each other by using a planetary gear mechanism.

As mentioned above, in accordance with the invention, the following effects can be obtained.

(1) Since the magnet type heater corresponding to the heat source is strong against the moisture with different from the electric heater, an insulation of the heater is not required, so that a manufacturing cost is inexpensive and the apparatus can be used in the liquid.

(2) Since the magnet type heater is used for the heat source, whereby the fan itself can be used as a heat generating body, an independent blower is not required, so that in addition that it is possible to make the apparatus small and compact, it is possible to make compact even when combining with the heater and the heat exchanger.

(3) Since the non-contact type magnet type heater is used for the heat source, performances of a maintenance free, a heat resistance and a durability are excellent.

(4) There is no risk of a fire due to an overheat in the case of the electric heater, a significant safety is achieved and a quick heating can be performed.

(5) Since it is possible to heat in the flow inlet port side and the discharge port side of the fluid, it is possible to obtain a fluid having a high temperature by a little air amount.

(6) It is possible to improve a combustion efficiency and an engine output of the turbine engine, and it is possible to prevent an icing at the frontmost stage.

What is claimed is:

1. An apparatus for generating a fluid flow and for simultaneously heating the fluid, said apparatus comprising: a casing having opposed front and rear walls, the rear wall having a permanent magnet securely mounted therein, the front wall having no magnet and having a fluid inlet formed therein, a rotatable member disposed between the front and rear walls of the casing, the rotatable member including a conductive material spaced slightly from the permanent magnet in the rear wall, the rotatable member being rotatable relative to the casing and being configured for generating a fluid flow through the inlet in the front wall in response to such rotation, and a drive means for rotatably driving the rotatable member relative to the housing and thereby generating movement of the conductive material relative to the permanent magnet, whereby rotation of the rotatable member relative to the housing generates a fluid flow through the inlet and into the housing and whereby slip heat generated by relative movement between the conductive material and the permanent magnet in the rear wall of the casing heats the fluid flowing into the casing by the rotation of the rotatable member.

2. An apparatus as in claim 1 wherein the conductive member is selected from the group consisting of a sirocco fan, a multiblade fan, an axial fan, a mixed flow fan, a centrifugal fan and an eddy current fan.

3. An apparatus as in claim 1 wherein the conductive member comprises an impeller.

4. An apparatus as in claim 1 wherein the conductive member is a pump wheel.

5. An apparatus as in claim 1 wherein the conductive member is rotatable about a rotational axis, the permanent magnet being mounted in the rear wall of the casing substantially concentrically about the rotational axis.

6. An apparatus as in claim 5 wherein the inlet in the front wall of the casing is substantially concentric with the rotational axis.

\* \* \* \* \*

UNITED STATES PATENT AND TRADEMARK OFFICE
CERTIFICATE OF CORRECTION

PATENT NO. : 6,144,020  
DATED : November 7, 2000  
INVENTOR(S) : Masayoshi Usui, Hiroshi Inoue and Kazunori Takikawa It is certified that error appears in the above-identified patent and that said Letters Patent is hereby corrected as shown below:

Amend field [75] of the first page of the patent to read:

--[75] Inventors: Masayoshi Usui; Hiroshi Inoue; Kazunori Takikawa, all of Numazu, Japan--.

Signed and Sealed this

Twelfth Day of June, 2001

*Attest:*

*Attesting Officer*

NICHOLAS P. GODICI  
*Acting Director of the United States Patent and Trademark Office*

UNITED STATES PATENT AND TRADEMARK OFFICE
CERTIFICATE OF CORRECTION

PATENT NO. : 6,144,020
DATED : November 7, 2000
INVENTOR(S) : Masayoshi Usui, Hiroshi Inoue and Kazunori Takikawa It is certified that error appears in the above-identified patent and that said Letters Patent is hereby corrected as shown below:

Amend field [75] of the first page of the patent to read:

--[75] Inventors: Masayoshi Usui; Hiroshi Inoue; Kazunori Takikawa, all of Numazu, Japan--.

Signed and Sealed this

Twenty-sixth Day of June, 2001

*Attest:*

*Attesting Officer*

NICHOLAS P. GODICI
*Acting Director of the United States Patent and Trademark Office*